(No Model.)
J. W. SPANGLER.
Fertilizer Distributer.
No. 233,040. Patented Oct. 5, 1880.
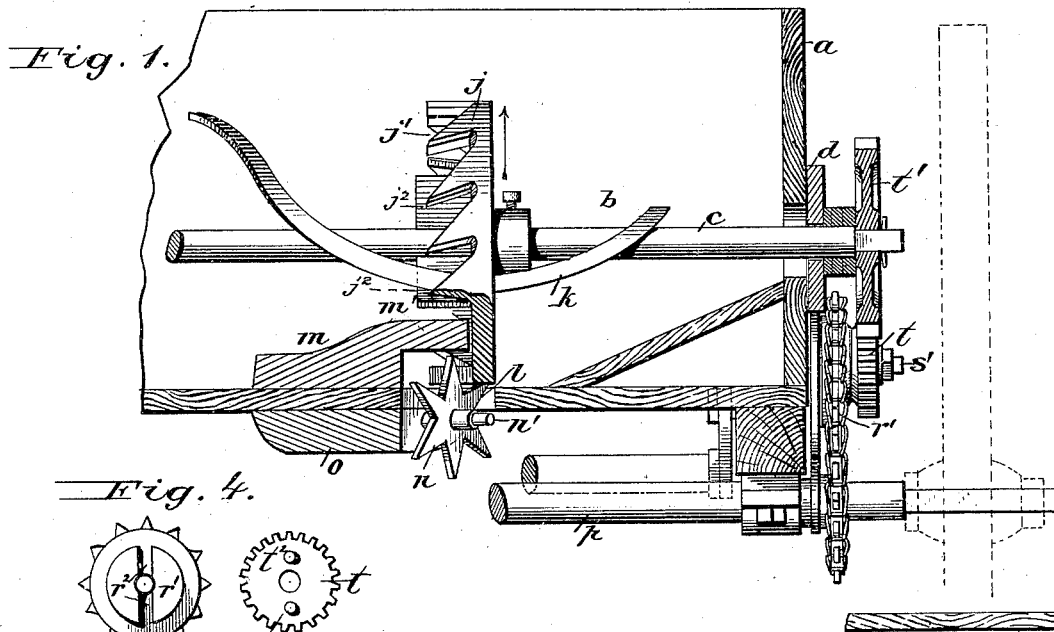
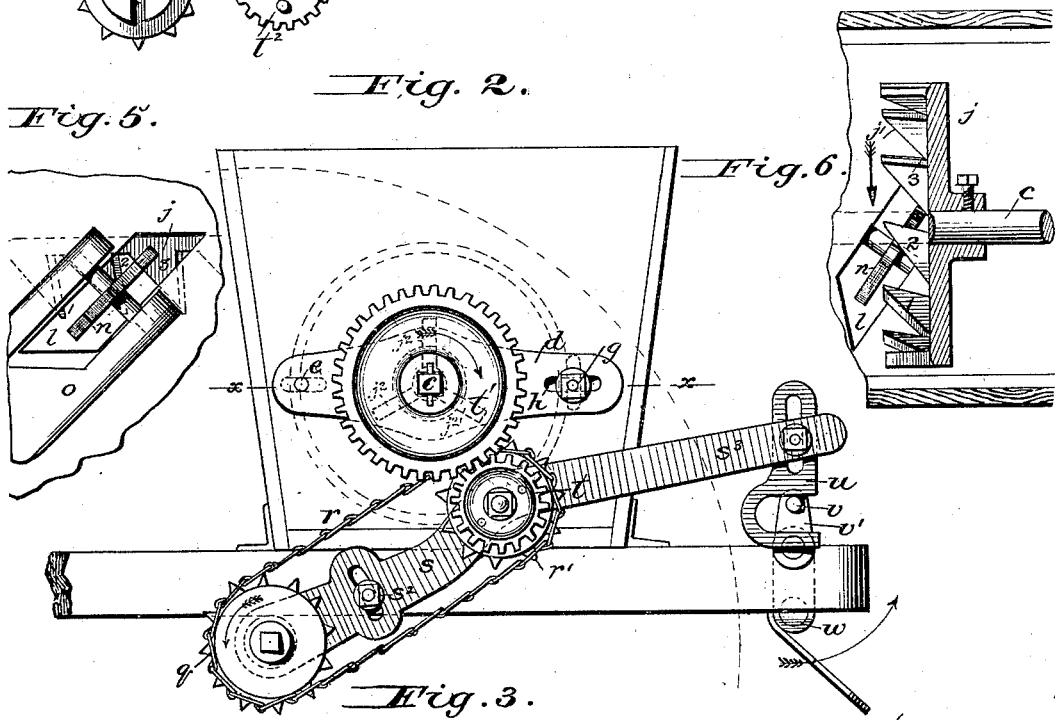
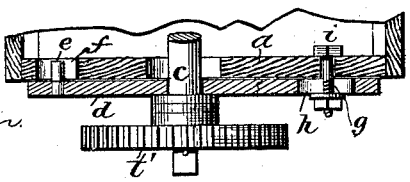
Attest:
H. L. Pennie
Alex Mahon
Inventor:
Jacob W. Spangler,
by his attorney,
Wm. N. Ginckel

UNITED STATES PATENT OFFICE.

JACOB W. SPANGLER, OF YORK, PENNSYLVANIA.

FERTILIZER-DISTRIBUTER.

SPECIFICATION forming part of Letters Patent No. 233,040, dated October 5, 1880.

Application filed March 11, 1880. (No model.)

*To all whom it may concern:*

Be it known that I, JACOB W. SPANGLER, of York, in the county of York, in the State of Pennsylvania, have invented certain new and useful Improvements in Fertilizer-Distributers, of which the following specification, taken in connection with the accompanying drawings, is a full, clear, and exact description.

My invention relates to that class of machines which are adapted to sow or distribute pulverized fertilizers, such as the well-known agricultural phosphates, bone-dust, &c.

The invention consists in a force-feed fertilizer-distributer having a rotating toothed or fingered wheel resembling a crown-wheel, and working in a box over an oblique opening or discharge-orifice, and also having a spur or clearing wheel and a curved bar for keeping the fertilizer in the hopper pulverulent, the said spur or clearing wheel being rotated by meshing with the feed-wheel, and serving to keep the teeth of such feed-wheel free of clogging fertilizer.

The invention also consists in means for regulating or changing the speed of the feed-wheel, and, consequently, governing the quantity of fertilizer sown, which means also serve to raise and lower the boots, all as hereinafter more particularly specified and claimed.

In the drawings illustrating my invention, in the several figures of which like parts are similarly designated, Figure 1 is a longitudinal vertical section of a portion of the machine sufficient to show the invention. Fig. 2 is an end view, showing, in elevation, the means for changing the speed. Fig. 3 is a horizontal section on the line $x\ x$ of Fig. 2, showing the mode of removably hanging the feed-shaft; Fig. 4, details, in elevation, of the changeable gearing; Fig. 5, a bottom elevation of the clearing-wheel and oblique slot in the hopper-bottom; and Fig. 6 is a top view with the feed-wheel in horizontal section, also showing the oblique slot.

Commercial agricultural phosphates, however finely pulverized and dry in the sack or bag, upon exposure in the sower or distributer are very absorbent, and soon agglomerate, become pasty and massy, so that instead of falling on the earth in dust they are distributed in lumps. This condition of the fertilizer in the machine makes the draft hard or heavy and wears out the machine. My invention is designed to overcome these difficulties, and it is applicable to many of the machines, if not all of them, now in use.

The hopper $a$ may be divided into a number of boxes, $b$, having ends and sides preferably inclined toward the discharge-orifice.

$c$ is a feed-shaft, mounted in the hopper longitudinally in plates $d$, which are detachably connected to the ends of the hopper by a pin, $e$, resting in a horizontal slot, $f$, and a bolt, $g$, extending through a horizontal slot, $h$, in the plate $d$, and a vertical slot, $i$, in the hopper end. By this construction the shaft may be adjusted vertically in the hopper, and also by disconnecting its driving-gearing it may be removed bodily from said hopper.

Upon the shaft $c$, within the boxes, one to each box, are secured a number of feed-wheels, $j$. These wheels are provided with teeth $j'$, projecting at right angles or horizontally therefrom, and are arranged to rotate in the direction of the arrow, Figs. 1 and 6, the faces or feeding-edges of the teeth or fingers $j'$ standing at a very obtuse angle to the vertical and their backs at an acute angle, so that as such wheels are rotated to feed the fertilizer, when their teeth meet any hard substance—as a stone—instead of such substance being carried forward to damage the machinery, it will be shoved back into the box by reason of this slant of the working-faces of the teeth.

Projecting horizontally from the face of the body of the feed-wheels, on a line with their shaft, are flat or other shaped buckets or vanes $j^2$, preferably three to each wheel, disposed equidistantly thereon, as indicated by the dotted lines on the wheel $t'$ in Fig. 2. These vanes $j^2$ may be cast with or separately applied to the feed-wheels, and their office is to throw the fertilizer down to the feeding-point of the teeth and to aid the stirrers $k$ in preventing clogging.

Each feed-wheel is provided with one or more stirrers or bars, $k$, of a curved or spiral form, extended horizontally through the same, by which the fertilizer is prevented from arching as it becomes massy, and is kept as finely pulverulent as possible, so as to insure its being fed. It will be understood that the rotating toothed feed-wheels aid in insuring this pulverulency; but the tendency of all feeding devices is to cause the fertilizer to arch about them, and hence auxiliary stirrers are necessary.

Beneath the feed-wheels, and in the bottoms of the boxes, openings or discharge-orifices $l$ are arranged obliquely to the plane of rotation of the said feed-wheels, and said openings are covered by caps $m$, having lips $m'$ overhanging the teeth of the feed-wheels, to prevent the free escape of the fertilizer and regulate the quantity taken by the feed-wheels. These openings, as usual, may be connected by tubing with the drill-boots, and they are made oblique in a direction the reverse of or intersecting the working-faces of the teeth $j'$ of the feed-wheels, so that at no time shall said openings be free of some working or feeding portion of said teeth.

Referring to Figs. 5 and 6, it will be seen that tooth 1 is just clearing, but still partly in, the orifice. Tooth 2 is fully in, and is in position for dropping the portion of fertilizer carried by it, while tooth 3 is just beginning to throw its load in, so that the feed will not be intermittent, but, on the contrary, it will be continuous. This mode of operation is of decidedly practical advantage, as it insures uninterrupted sowing or distribution of the fertilizer, whereas heretofore the distribution has been in masses or lumps at intervals, so that the earth would be manured unevenly and unequally.

As the fertilizer becomes pasty and agglomerates it tends to clog in between the teeth of the feed-wheels, and so refuses to fall; and to insure its falling and the clearing of such teeth I arrange in the discharge-orifices spur-wheels $n$, the teeth of which extend upwardly between the teeth of the feed-wheels, and whereby rotary motion is imparted to said spur-wheels. These spur-wheels are supported upon shafts $n'$, arranged in bearing-plates $o$, secured to the bottom of the hopper. I have given but this one illustration of means for supporting such wheels. Others are obvious, and the invention is not limited thereto.

The shaft $c$, with its feed-wheels, needs to be frequently removed for clearing off the fertilizers, many such containing acids, &c., injurious to iron. This removal is readily accomplished by means of the detachable bearings hereinbefore described, the shaft being pushed out at one end until its opposite end shall fall within the hopper, when the other end may be drawn out from within the hopper.

The shaft $c$ is driven from the axle $p$ of the supporting-wheels, which axle is provided with a chain-wheel, $q$, connected by a chain, $r$, with another chain-wheel, $r'$, on a swinging lever, $s$, said lever having its fulcrum on the said axle $p$, and bearing, in rotary connection with its wheel $r'$, a pinion, $t$, which meshes with a pinion, $t'$, on said feed-wheel shaft $c$.

The wheels $r'$ $t$ revolve on a stud, $s'$, on the lever $s$, and said wheels are detachably connected by means of pins $t^2$ $t^2$ on the one entering holes or slots $r^2$ in the other.

The pinion $t$ is removably secured upon the stud $s'$, so that when it is desired to change the speed of the feed-shaft, and consequently increase or diminish the feed of fertilizer, a smaller or larger pinion may be readily substituted for it.

I propose to furnish a set of pinions with each machine. The said pinion being placed upon a swinging lever, the different sizes may be readily adjusted to the feed-shaft pinion.

The lever may be set at the required adjustment by a thumb-screw, $s^2$. The said lever is extended rearward into an arm, $s^3$, upon the end of which is adjustably secured a hook, $u$, with which engages a pin, $v$, on an arm, $v'$, of the shaft $w$, with which the boot-operating chains are connected, so that the raising of the boots stops the feed, or vice versa.

The hooked plate $u$ is adjustable on the arm $s^3$, to raise and lower it to correspond with the size of the pinion $t$.

Instead of the pins and slots for connecting the pinion $t$ and wheel $r'$, said pinion may have a square hub to fit on a square stud on the lever $s$, and said stud would then rotate in said lever; or the chain-wheel might revolve on a round stud and the pinion be fitted on a square hub projecting from said chain-wheel.

The feed-wheels may be of cast metal.

What I claim is—

1. In a fertilizer-distributer, a rotary shaft, a feed-wheel thereon, and teeth projecting at right angles or horizontally from said feed-wheel, and having obtuse-angled working-faces adapted to throw off obstructions, substantially as described.

2. In a fertilizer-distributer, a rotary shaft, and a feed-wheel thereon having obtuse-faced teeth projecting at right angles or horizontally from the periphery of said wheel and working closely over the discharge-orifice, in combination with a clearing-wheel whose spurs project between the said teeth, all arranged to operate substantially as described.

3. In a fertilizer-distributer, the combination of a hopper having oblique discharge-orifices, spur-wheels arranged therein, and rotary feed-wheels having horizontal feeding-teeth, two or more of which are simultaneously in course of passage over such oblique discharge-orifices, to insure a continuous feed, substantially as described.

4. The combination of the rotary feed-wheels and the curved stirrers $k$, as shown, substantially as described.

5. The combination of the rotary feed-wheels, the stirrers secured thereto, and the clearing-wheel, substantially as described.

6. The combination, with the rotary feed-shaft, of the axle, chain-gearing, a swinging lever, and a changeable pinion, substantially as described.

7. The combination, with the feed-wheels, of buckets or vanes disposed therein so as to throw down the fertilizer and aid in preventing clogging, substantially as described.

To the above specification of my invention I have signed my name this 8th day of March, A. D. 1880.

JACOB W. SPANGLER.

Witnesses:
   J. F. STRAWINSKI,
   J. B. SPRENKEL.